(12) United States Patent
Muench et al.

(10) Patent No.: US 6,504,624 B1
(45) Date of Patent: Jan. 7, 2003

(54) PHOTOGRAPHIC PRINTING APPARATUS WITH MEANS FOR GENERATION OF VIDEO SIGNALS

(75) Inventors: Reimund Muench, Munich (DE);
Gerhard Benker, Icking (DE);
Arnfried Kiermeier, Dachau (DE);
Bernhard Lorenz, Freising (DE);
Ekkehard Gross, Munich (DE)

(73) Assignee: Agfa-Gevaert Aktiengesellschaft, Leverkusen (DE)

( * ) Notice: Subject to any disclaimer, the term of this patent is extended or adjusted under 35 U.S.C. 154(b) by 895 days.

(21) Appl. No.: 08/731,560

(22) Filed: Oct. 16, 1996

(30) Foreign Application Priority Data

Oct. 25, 1995 (DE) .......................................... 195 39 690

(51) Int. Cl.⁷ ................................................ G06F 3/12
(52) U.S. Cl. ......................... 358/1.5; 358/1.5; 358/501; 358/527
(58) Field of Search .................... 358/500, 501, 358/506, 512, 514, 515, 527, 518; 348/96, 97, 98, 104, 105, 110, 111, 199, 195; 355/18, 33, 38; 395/105

(56) References Cited

U.S. PATENT DOCUMENTS

| | | | | |
|---|---|---|---|---|
| 4,279,502 A | | 7/1981 | Thurm et al. | |
| 4,667,245 A | * | 5/1987 | Matsumoto et al. | 348/96 |
| 4,835,603 A | * | 5/1989 | Kano et al. | 358/518 |
| 4,922,333 A | * | 5/1990 | Nutting et al. | 358/512 |
| 5,053,807 A | * | 10/1991 | Uryu | 355/38 |
| 5,128,710 A | * | 7/1992 | Delung | 355/38 |
| 5,164,764 A | * | 11/1992 | Schmerler et al. | 355/38 |
| 5,276,534 A | * | 1/1994 | Mutze | 358/487 |
| 5,303,000 A | * | 4/1994 | Benker et al. | 355/41 |
| 5,383,035 A | * | 1/1995 | Suzuki | 358/500 |
| 5,410,347 A | * | 4/1995 | Steinle et al. | 358/512 |
| 5,838,457 A | * | 11/1998 | Umemoto | 358/501 |

FOREIGN PATENT DOCUMENTS

| | | |
|---|---|---|
| DE | 2840287 | 4/1980 |
| DE | 4230449 | 3/1994 |

* cited by examiner

*Primary Examiner*—Mark Wallerson
(74) *Attorney, Agent, or Firm*—Milde & Hoffberg, LLP

(57) ABSTRACT

Apparatus is disclosed for acquiring video signals with high resolution in the optical path of a photographic printing device for point-by-point color video signal generation by means of a video image sensor which receives the original negative image. For generation of the video signals, a sufficiently high-resolution black and white video sensor (27) is used. The three color separations are delivered separately to the video sensor by means of a plurality of color filters (4, 5, 6) which are present for printer illumination control and are brought consecutively into their active setting.

14 Claims, 2 Drawing Sheets

PHOTOGRAPHIC PRINTING APPARATUS WITH MEANS FOR GENERATION OF VIDEO SIGNALS

BACKGROUND OF THE INVENTION

The present invention relates to a photographic printing apparatus for printing photographs from negative images. The apparatus has a source of illumination and an optical path directed through a negative frame window for imaging negative frames on photographic printing material. The apparatus further includes a plurality of color filters, displaceable into the optical path, for printing illumination control as well as a video sensor, also displaceable into the optical path, for generating video signals representing high resolution color images of an original negative frame.

In the field of photographic printing technology on various occasions a need has arisen, in addition to producing a photographic print as an optical image of the original negative, to acquire the video content of the negative, point by point and with high resolution, for video reproduction in a different context. A system of this type is known, for example, from German patent No. 42 30 449 which produces so-called "package prints." In this system, the original negative frame, illuminated with correct colors, is imaged by means of a tilted mirror into a color television camera, in order to process so-called "class photographs." Such color television cameras are well known from video technology. They are either equipped as single chip cameras with corresponding pixel-type color filtration for acquisition of the three color separations, or the image is optically divided and passed, through interposition of corresponding color filters, into three different sensor chips, whose images then can be superimposed back together. The latter type of processing is naturally very expensive. Also, the former type of processing is very expensive for high resolution levels (i.e., high pixel numbers) and the color filters are attuned to visual sensitization (i.e., to the sensitivity of the eye). However, this sensitivity deviates considerably from the spectral sensitivity of the normal photographic printing materials. Thus, when these video signals are not only to be reproduced on a screen for viewing, for example, but also to be illuminated on photographic printing material, very expensive color corrections are necessary. These normal color video cameras are used for image acquisition in photographic devices only because, based on their widespread use for video purposes, they are obtainable at relatively reasonable prices, and a rapid acquisition of color originals is possible through the simultaneous generation of the three color images.

In recent times, video signal acquisition has been desired primarily for production of so-called "index prints;" that is, for the greatly reduced reproduction of all pictures of a film on a single sheet, to reproduce for photographers all pictures from their film together with the negative number in the film. Index prints are extremely useful for such things as making subsequent reorders.

When index prints are also to be produced from films that are processed at so-called "mini-labs", the color video cameras customary with high performance devices are still too expensive. On the other hand, speed of image acquisition does not play such an important role.

SUMMARY OF THE INVENTION

The principal object of the invention is to provide apparatus of the type described above for video image acquisition that can be justified in terms of its production costs for mini-labs as well.

This object, as well as other objects which will become apparent from the discussion that follows, are achieved, in accordance with the present invention, by providing a black and white video image sensor with a sufficiently high resolution for generating the video signals and by providing means for displacing the color filters into the optical path to provide color separation for the video sensor.

The present invention proceeds from the recognition that black and white image sensors, which in fact need no complicated pixel-type color filtration, or three sensors for each color, are available at reasonable cost. The color filters that are present in color photographic printing equipment are better adapted from the outset to the spectral sensitivity of the printing material than are color filters tuned to visual sensitization in single tube video cameras.

According to one embodiment of the invention, this technique is also applicable to the photographic printing procedure using white light and subtractive post-exposure that is particularly appropriate for simpler color printing devices. Here, so-called "subtractive filters" in the colors of cyan, magenta and yellow are brought into the printing light optical path as so-called "color shutters", if the required amount of printing light in the printing exposure, starting with white light, is incident on the photographic printing material in the colors red, green or blue.

However, since color separation in the basic colors of red, green and blue is required for video signal generation, in each case two of the three filters are simultaneously brought into the illuminating optical path of the original negative to produce, successively, the basic colors of red, green and blue.

According to a particularly preferred embodiment of the invention, an unfiltered planar CCD is provided as a video image sensor.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
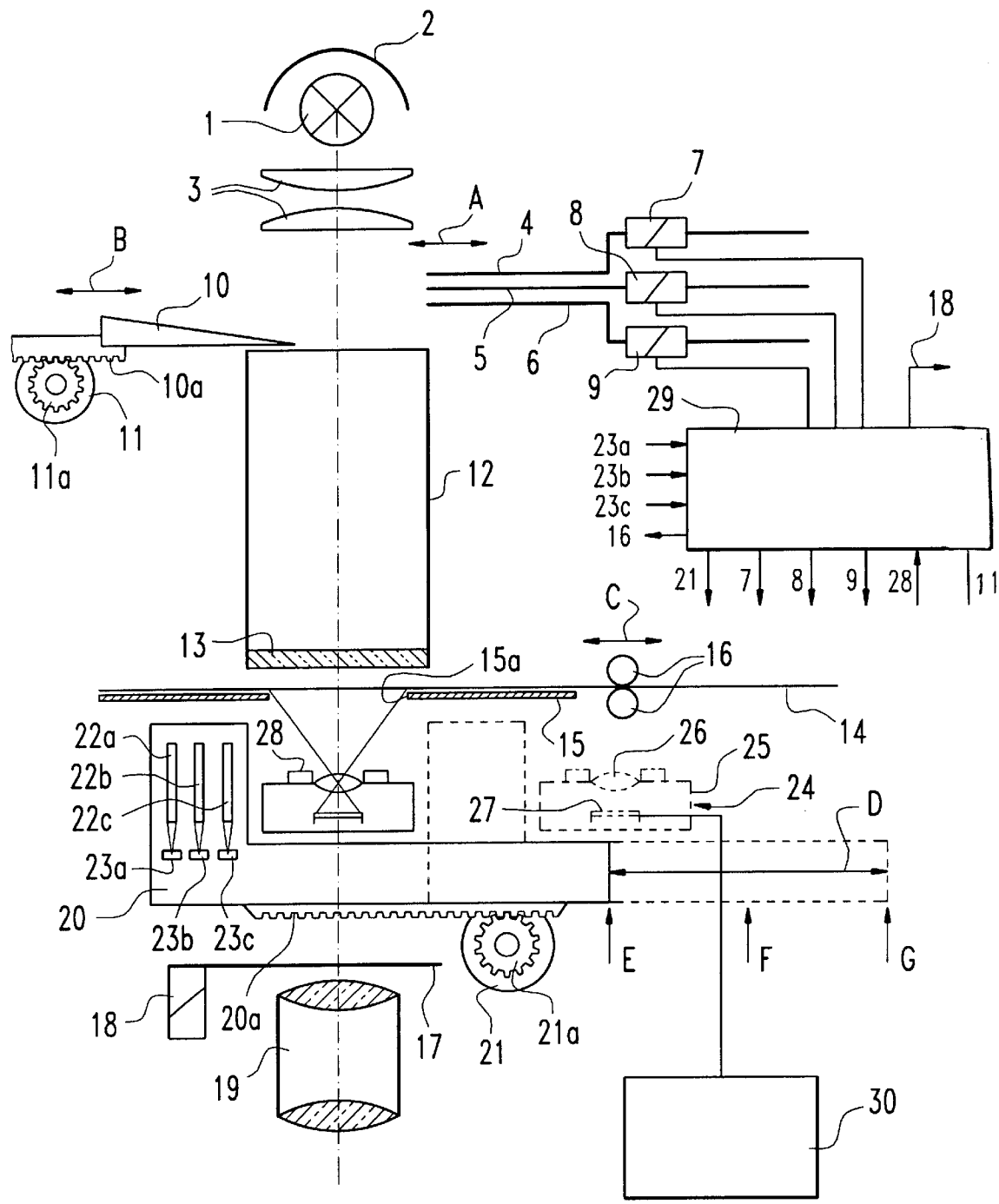
FIG. 1 is a schematic illustration of color photographic printing apparatus with a device for video signal acquisition according to the invention.

The preferred embodiments of the present invention will now be described with reference to FIGS. 1 and 2 of the drawings. Identical elements in the various figures are designated with the same reference numerals.

Figure 2:
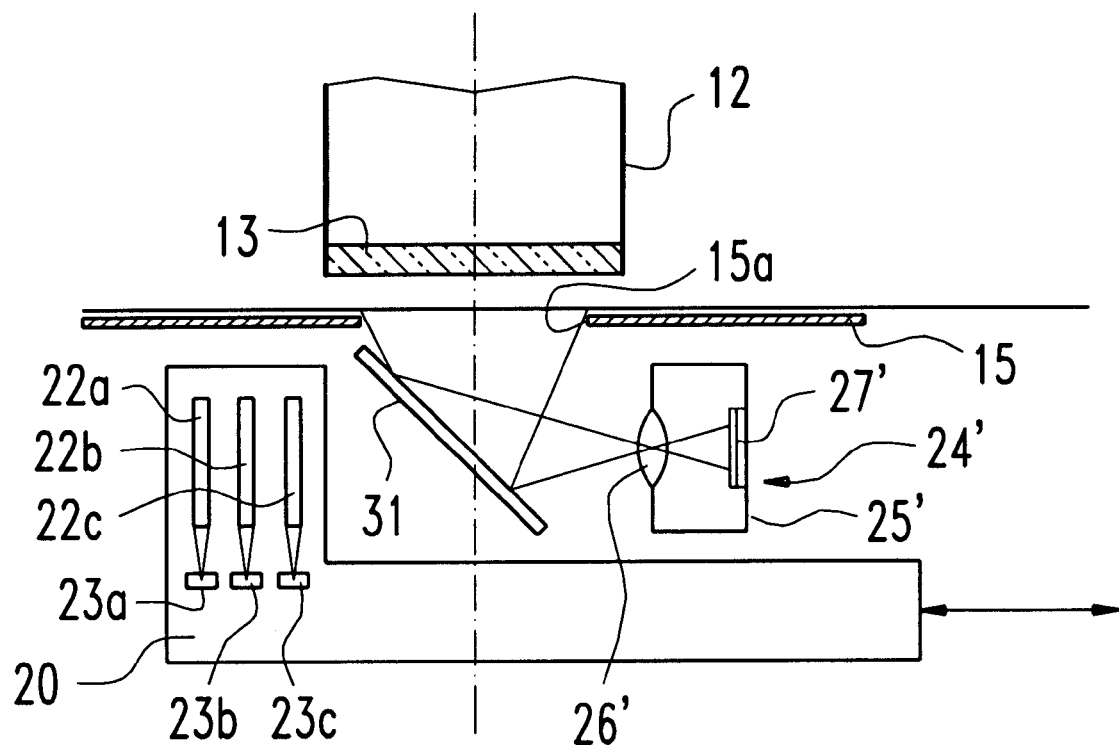
FIG. 2 is a schematic illustration of a modified embodiment of a portion of the photographic printer of FIG. 1 with a mirror for scanning beam deflection.

FIG. 1 shows a photographic printing light source, specifically a halogen lamp which produces essentially white light. Its light is passed through a reflector 2 and a double condenser 3 into a mirror box 12 whose sides are mirror reflecting. At the exit side of the mirror box 12 is a diffusing plate 13, which uniformly illuminates an underlying printing window 15a in a film guide 15. Because of reflection coating of the mirror box 12, even with certain inhomogeneities in the brightness distribution at the entry opening of mirror box 12, the diffusing plate 13 is illuminated essentially uniformly.

Between the condenser 3 and the mirror box 12, and activated by corresponding control magnets 7, 8 and 9, are color filters 4, 5 and 6 which can be inserted into the optical path. Depending upon the type of printing procedure used, these are either so-called "additive" filters in the colors of red, green and blue or so-called "subtractive" filters in the colors of cyan, magenta and yellow. In a printing procedure with additive filters, through alternate insertion of each of the filters, the color printing process proceeds in such a way that first only red light is incident on the negative original, and then to the required extent green light and then finally blue light. This process can also be run in any other desired color sequence. Alternatively, printing can also start first with white light—i.e., in all three colors simultaneously—and as soon as sufficient light is incident on the original in one of the three colors, then first one filter of the not yet completely illuminated color is inserted, and then the other.

With the so-called "subtractive" filters in the colors of cyan, magenta and yellow, the normal printing procedure commences with white light, and then, after attaining the required printing light amount in one of the three colors, the appropriate rejection filter is inserted into the optical path as a so-called "color shutter". Thereafter, after reaching the desired printing light amount in the second color, the appropriate second rejection filter is inserted, and finally, upon completion of the most lengthy illumination, a shutter 17 is inserted by activating its magnet 18.

Set forth hereinbelow is an explanation of how the printing light amount to be used in each color for each original negative frame is determined by means of the scanning device.

Finally, an intensity regulation device is provided between the movement plane of color filters 4, 5 and 6 and the entrance to the mirror box 12. This device comprises a movable wedge filter 10 with a drive mechanism containing a toothed rack 10a, a motor 11 and a pinion 11a linked to the motor 11 and engaged into the toothed rack 10a. This wedge filter 10 can be moved by the motor 11 in the direction of the arrows more or less far into the optical path. Due to the nature of the mirror box 12, the nonuniform light intensity distribution is equalized between the entrance to the mirror box and diffusing plate 13. A greatly simplified form of intensity control in the lamp housing would be an apertured diaphragm that can be rotated by a magnet, providing only two brightness levels.

The printing window 15a lying beneath diffusing plate 13 is located in a film platform 15. Beneath the window 15a is a carriage 20 which, by means of a toothed rack 20a into which a pinion 21a of a motor 21 engages, can be moved back and forth perpendicular to the optical axis of the printing device in the direction of the arrow D. The carriage 20 can assume a minimum of three settings, which are designated by congruence of the right side edge of the carriage 20 with one of the arrows E, F and G.

On the carriage itself is placed a scanning device 22, 23 formed of a plurality of light transmitting strips 22a, 22b and 22c which are so-called "self-focusing" lenses. These strips comprise glass fibers with a gradient in their refractive index toward the middle having a property that, owing to total internal reflection, they can transmit clustered light largely loss free. The self-focusing lens strips 22a, 22b, 22c are so placed that, when the carriage is in position F, they pass images of three certain sectors of the photographic film 14, which moves in the direction of the arrow C, onto three diode strips 23a, 23b and 23c, respectively, that are placed beneath these self-focusing lenses. Each of the diode strips is equipped with a color filter in the colors of red, blue and green whose spectral transmissivity, together with the spectral sensitivity of the diodes, matches exactly the spectral sensitivity of the photographic printing material. In the carriage position F, the scanning devices 22a, 22b, 22c, with the diodes 23a, 23b and 23c, lie beneath the printing window 15a, so that when the printing light source 1 is switched on, the density of the film 14, drawn forward strip by strip in sector terms by rotation of rollers 16, is acquired by diode strips 23a, 23b, 23c in the three colors. Displacement of the three strips 23a, 23b, 23c in the direction of arrow C to each other then has the effect of a temporal delay of the respective signals. Allowance is made for this in storing these signals, and the three color density values of the individual areas of the original negative are stored in a memory for evaluation.

A central computing device 29 is provided for, among other things, evaluation of the density signals of measurement cell rows 23a, 23b, 23c. The U.S. Pat. No. 5,303,000 discloses combining the measurement values into sector density values. The U.S. Pat. No. 4,279,502 teaches the calculation of the required printing light from this information in each of the three colors for each individual original negative frame.

In addition to the scanning device, a black-and-white video camera 24 is placed on the carriage 20 for density measurements by sectors. This camera comprises a housing 25 having a lens 26 arranged at an opening on the top. The lens 26 images the printing window 15a onto a black-and-white (i.e., unfiltered) planar CCD 27. The video signals delivered from the planar CCD are passed via an appropriate line to a video memory 30. The video camera 24 is located directly in the optical axis of the printing device when the right edge of carriage 20 is congruent with arrow E. As shown in FIG. 1, opto-electric converters 28 are placed on the top side of housing 25; these lie in the stray light region of the original in printing window 15a. The signal provided by optical receivers 28 is a measure of the brightness at the black-and-white CCD 27. By means of the central control device 29, the intensity can be so controlled by adjusting the position of the wedge filter 10 for each individual original negative frame in the printing window: 15a for each individual color, that the CCD is modulated directly in the linear range. Alternatively, instead of the signals of the additional measuring devices 28, the already determined density values of the original sectors can be evaluated for the purpose of determining with what intensity the particular original is to be illuminated in the color concerned.

The carriage has still another setting, indicated by a dashed line, all the way to the right, in which its right edge is congruent with arrow G. In this setting, the optical path from printing window 15a to the shutter 17 is free, so that after opening this shutter a lens 19 can image the original negative frame onto photographic printing material which is not shown.

The method of operation of the apparatus just described is as follows:

In its initial state, the shutter 17 is closed, the wedge filter 10 and filters 4, 5 and 6 are completely removed from the optical path, and the light source 1 is already switched on for sector-specific density measurement. The carriage 20 is brought to position F by the central control device. The negative film strip is inserted into the transport rollers 16 from the left, for example, and is then transported continuously through the printing window while the respective area-specific density values in the three colors are stored in the central computing device 29. There, as disclosed in the aforementioned German patent No. 28 40 287, for each individual original negative frame, they are evaluated for calculation of the printing light amounts in the three colors. With the entry of last original frame of the film 14 into the printing window 15a, this density measurement procedure is completed, and the printing run-through can be commenced. For that purpose, the rotational direction of the rollers 16 is reversed and additional rollers on the entry side are activated, to position one original negative frame after the other in the printing window 15a. For this purpose, the carriage 20 is brought by the motor 21 into the G setting, and the printing process begins with opening of the shutter 17 with white light.

If the apparatus is set up for the white light illumination printing process with subtractive post-illumination, then unfiltered light is passed to the original in printing window 15a until the end of the shortest individual color illumination. Upon reaching the end of the blue illumination, for example, the yellow filter 6 is brought into the optical path by means of the magnets 9 which are controlled by computing device 29 and thus the blue illumination ceases. Illumination in red and green continues, until, by appropriate control of magnets 7 and 8, the appropriate rejection filters are brought into the optical path. With the completion of the last illumination, shutter 17 is closed, but the original transport mechanism 16 is not yet activated. With the light source 1 switched on, the video camera 24 is brought into the optical path by the central control device 29; that is, the carriage 20 is moved to the position of the arrow E. The negative frame original in the printing window 15a is then imaged by the lens 26 onto the CCD 27. To obtain the video signals for the individual color separations from the CCD 27, at first the two printing filters 4 and 5 in the colors cyan and magenta are brought into the optical path. This combination of filters passes only blue light, so that only the blue color separation is acquired from CCD 27. Therefore as controlled by central computing device 29, the video signals of the blue color separation are delivered to the video memory 30. Matching the readout time of CCD 27, the dwell time of the filters can be very short. Then filters 5 and 6 in the colors magenta and yellow are brought into the optical path, and the red separation produced thereby from CCD 27 is acquired, and its video signals are stored in memory 30.

The process is even easier with a printing procedure using additive filters in red, green and blue. In each case, with insertion of the corresponding printing filter in these colors, the corresponding color separation is also present in CCD 27. In each instance, when a filter is replaced, while employing measurement values from the density scanning process, the wedge filter 10 can be moved by the motor 11 into such a position, and the illumination intensity can be so controlled for the CCD, that the CCD will operate in its most favorable control sector. The intensity regulation also makes allowance for the overall transmissivity of the original negative frame as well as its color content, so that actually an optimal control is attainable for each color. If the intensity regulation is carried out by the photoreceiver 28 placed in the stray light sector, the intensity optimization can only commence if the color filters are already in the optical path.

Alternatively, the brightness regulation for the CCD can be derived from measurements of a separate scanner, or from the signals plotted on the film in the surveying camera.

The sequence for acquisition of the color separations do not have to match the example described above. For example, scanning time can be saved if color separations with approximately equal brightness are scanned one after the other, so that no intensity alterations need to be undertaken in the interim. In this case it is also possible to achieve the goal of carrying out image acquisition during transport of paper, so that printing performance is not impaired by image signal acquisition.

After completion of the acquisition of video signals from each original negative frame, by activation of the roller drive 16 and the motor 21, the next original is brought into the printing window, and the carriage 20 is placed in the setting G. The printing process for this next original can be started by opening the shutter 17. As described earlier, the process is just the same for the acquisition and transfer of the video signals of this next original into memory 30.

At the end of the printing process, the video signals of all original negative frames of this particular film are stored in the memory 30. In a known manner, they can be compiled with the associated negative numbers into a single overall picture, and outputted by means of an appropriate printing device.

The sequence or order of the printing process and video signal acquisition can also be reversed; that is, the video signals can be first acquired and then the originals optically printed. This sequence opens up a possibility of making visual judgments with the video signals of the image content on a monitor, for such things as assessing whether the image is worth printing, or whether there is a need to make corrections.

Various variations of the apparatus are also possible: First, as per FIG. 2, where functionally identical parts are designated with a prime ("'"), a full mirror 31 can be placed at a 45° angle in the optical path for a video camera 24', so that more degrees of freedom exist for the imaging path. To correctly read out the image laterally reversed by a mirror, in reading out the memory, the readout direction must be reversed. Then, at least with the type of printing using additive illumination running sequentially by insertion of a filter in red, green and blue, by placing a partially translucent (half-silvered) mirror in the optical path that reflects the image of the original negative frame in the printing window 15a on a laterally placed CCD, the video signal generation can take place simultaneously with the printing process. The intensity control for optimal illumination of the CCD must then take place, however, in the diverted optical path. The carriage 20 then requires only two settings, namely one for the scanning of density values in the sectors of the original, and a second one for the printing process, in which also the video signals are generated.

In place of, or in addition to, the attenuating intensity regulation in the light source housing, a so-called "shutter" present in modern video cameras can be used. This governs the integration times in 256 approximately logarithmic steps. It ensures a sufficiently fine adjustment of intensity in the linear sector of the CCD, without the disadvantages of an analog control such as increased hissing and disturbances in the control line. Here, in particular, it is possible to achieve an optimal adjustment for each color separation to the dynamic range.

There has thus been shown and described a novel photographic printing apparatus for generating video signals which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by, the claims which follow.

What is claimed is:

1. In photographic printing apparatus for printing color photographs from color negative image frames, said apparatus having a source of illumination and an optical path directed through a negative frame window for imaging negative frames on photographic printing material, said apparatus further including (1) a plurality of color filters, movable into and out of the optical path, for printing illumination control, (2) control means for moving individual ones of said color filters into and out of the optical path, (3) a black/white video image sensor for generating video signals representing a high resolution color image of an entire, original negative frame and (4) a video memory, coupled to the video sensor, for storing information representing such high resolution color image of said negative frame, the improvement wherein said control means is operative to move the color filters into and out of the optical path during video signal generation to provide color separation for the video sensor, whereby said color filters are used both for printing illumination control during printing and for color separation for the video sensor.

2. The apparatus defined in claim 1, comprising three additive color filters in colors red, green and blue, wherein said control means moves these filters individually and consecutively into and out of the optical path during photographic printing for color control, and wherein said control means also moves these filters individually and consecutively into and out of the optical path of the video sensor permitting the individual color separations to be acquired one after the other by the video sensor.

3. The apparatus defined in claim 1, comprising three subtractive color filters in colors cyan, magenta and yellow, wherein said control means moves these filters into and out of the optical path during photographic printing for color control after initial illumination of white light by said source and wherein these filters are also moved into and out of the optical path of the video sensor and wherein in every case two of the three subtractive filters are brought simultaneously into the optical path of the video sensor.

4. The apparatus defined in claim 1, wherein a black-and-white sensitive, two dimensional planar CCD serves as the video sensor.

5. The apparatus defined in claim 1, wherein the source of illumination is an essentially white light source; wherein the color filters exclude either one or two illumination colors depending on the filter characteristics; and wherein said apparatus further comprises (1) a control device which determines the required printing light amounts through appropriate movements of the color filters, (2) a focusing lens which images the original negative frame thus illuminated onto the photographic printing material, and (3) an unfiltered video sensor which generates video signals representing the original negative frame as the latter is illuminated through the filters.

6. The apparatus defined in claim 5, wherein the video sensor is selectively arranged in the optical path between the original negative frame and the focusing lens for video signal generation.

7. The apparatus defined in claim 6, wherein the video sensor includes a black and white sensitive, planar CCD and an associated imaging lens, said CCD and associated imaging lens being displaceable into and out of said optical path, thereby respectively interrupting and freeing the optical path between the negative frame and the focusing lens.

8. The apparatus defined in claim 6, further comprising a tilted mirror arranged in the optical path between the original negative frame and the focusing lens, thereby to direct an image of the original negative frame to the video sensor.

9. The apparatus defined in claim 7, further comprising a motor-driven carriage on which is mounted the imaging lens and the planar CCD, as well as a scanner for sector-wise optical density measurement for printing illumination control, and wherein the carriage is movable into at least three settings, one setting E for video signal generation, one setting F for density measurement by sectors, and one setting G for photographic printing.

10. The apparatus defined in claim 5, wherein the signal value of the video sensor is controllable via an intensity regulator.

11. The apparatus defined in claim 10, further comprising a logarithmic shutter for regulation of the integration time.

12. The apparatus defined in claim 9, further comprising a central control device for querying the sector optical density values in the F setting of the carriage;

for determining the printing light amounts for each of the original negative frames in three colors for appropriate regulation of the color filters and an intensity shutter in the G setting of the carriage; and in the E setting of the carriage, for controlling insertion of the filters into the optical path of the video sensor and adjustment of the signal value at the video sensor for each color by means of an intensity regulator.

13. The apparatus defined in claim 8, wherein said mirror is a partially translucent mirror which guides the three color separation images consecutively to the video sensor during printing illumination.

14. The apparatus defined in claim 1, wherein the video sensor is movable into and out of the optical path for selectively intercepting said image of an entire, original negative frame.

* * * * *